(12) United States Patent
Vanderhoek et al.

(10) Patent No.: US 7,693,700 B1
(45) Date of Patent: Apr. 6, 2010

(54) CACHING TECHNIQUE FOR ELECTRICAL SIMULATION OF VLSI INTERCONNECT

(75) Inventors: Tim Vanderhoek, Toronto (CA); David Lewis, Toronto (CA)

(73) Assignee: Altera Corporation, San Jose, CA (US)

( * ) Notice: Subject to any disclaimer, the term of this patent is extended or adjusted under 35 U.S.C. 154(b) by 915 days.

(21) Appl. No.: 10/462,031

(22) Filed: Jun. 13, 2003

Related U.S. Application Data (60) Provisional application No. 60/469,536, filed on May 9, 2003.

(51) Int. Cl.
*G06F 17/50* (2006.01)
(52) U.S. Cl. ........................................ 703/14
(58) Field of Classification Search ............... 703/13–19
See application file for complete search history.

(56) References Cited

U.S. PATENT DOCUMENTS

| | | | | |
|---|---|---|---|---|
| 5,878,053 | A * | 3/1999 | Koh et al. | 714/724 |
| 5,903,468 | A * | 5/1999 | Misheloff et al. | 703/16 |
| 5,953,519 | A * | 9/1999 | Fura | 716/18 |
| 6,090,152 | A * | 7/2000 | Hayes et al. | 716/6 |
| 6,321,366 | B1 * | 11/2001 | Tseng et al. | 716/6 |
| 6,389,379 | B1 * | 5/2002 | Lin et al. | 703/14 |
| 6,694,289 | B1 * | 2/2004 | Chen | 703/14 |
| 6,725,185 | B2 * | 4/2004 | Clement | 703/14 |
| 6,789,237 | B1 * | 9/2004 | Ismail | 716/4 |
| 6,813,597 | B1 * | 11/2004 | Demler | 703/14 |
| 6,851,097 | B2 * | 2/2005 | Zhang et al. | 716/5 |
| 6,856,148 | B2 * | 2/2005 | Bodenstab | 324/713 |
| 6,857,110 | B1 * | 2/2005 | Rupp et al. | 716/4 |
| 7,283,942 | B1 * | 10/2007 | Lewis | 703/14 |
| 2002/0065643 | A1 * | 5/2002 | Hirano et al. | 703/19 |

OTHER PUBLICATIONS

J. Alvin Connelly/Pyung Choi, Macromodeling with SPICE, 1992, Prentice hall, pp. v-xiv, 1-240.*
Intusoft, 1988-1996, IsSPICE4 User's Guide, pp. 1-18, 37-84, 109-216, 238-239.*

* cited by examiner

*Primary Examiner*—Paul L Rodriguez
*Assistant Examiner*—Eunhee Kim
(74) *Attorney, Agent, or Firm*—Townsend and Townsend and Crew LLP (57) ABSTRACT

Circuits, methods, and apparatus for including interconnect parasitics without greatly increasing circuit simulation complexity and run times. Interconnect paths are reduced to one of a number of simplified topologies based on path width, length, or other parameters. The input drive waveform is similarly approximated. A grid array is formed in advance, where each point in the grid array corresponds to a set of values relating to a path topology, input waveform, and resulting output waveform. The simplified interconnect path and input waveform are mapped into a set of parameters which corresponds to a location in the predetermined grid array. The output waveform is determined by interpolating output waveforms from gridpoints surrounding the location.

36 Claims, 10 Drawing Sheets

CACHING TECHNIQUE FOR ELECTRICAL SIMULATION OF VLSI INTERCONNECT

BACKGROUND

The present invention relates to the simulation of electrical circuits, more particularly the simulation of interconnect lines on integrated circuits.

Integrated circuits such as very large-scale integrated (VLSI) circuits consist of a large number of transistors connected by several layers of metal formed into connecting lines. For example, programmable logic devices include hundreds of thousands or millions of devices connected together by 8 or more levels of interconnect. These programmable logic devices are programmed to provide a specific function by varying the interconnect paths using pass gates and other programmable interconnecting circuits. The result is that a single programmable logic device includes a variety of interconnecting paths.

These paths contribute parasitic or stray capacitances and resistances at the output of drivers on the integrated circuit. For example, each trace forms a capacitor to other traces, particularly those above, below, and to the side of it, to nearby devices, and to the substrate. Each trace also has a series resistance associated with it. Interconnect traces of different widths and lengths have different stray capacitances and resistance associated with them.

Before an integrated circuit is sold to a customer or programmed for use in a system, it is simulated to ensure proper functionality in the end product, particularly given various temperature and supply variations that the device may experience. For many years, circuit designers simply modeled interconnect traces as capacitors, when they were modeled at all. But as integrated circuit technology has progressed, and devices have gotten smaller while the number of metal layers has increased, other parasitics associated with interconnect lines, such as series resistance, and to a lesser extent inductance, have become more important and can no longer be ignored if accurate simulation results are needed.

But including the parasitic resistances and capacitances in a simulation is very complex and time consuming. First, these parasitics need to be accounted for, that is they need to be modeled. Second, they need to be included in the simulation itself, and doing so greatly increases the complexity of the circuit, the number of nodes, and run time of the simulation. Thus, what is needed are methods and apparatus for modeling and including these parasitics in circuit simulations without greatly slowing the simulation process.

SUMMARY

Accordingly, embodiments of the present invention provide methods and apparatus for including interconnect parasitics without greatly increasing circuit simulation complexity and run times. Interconnect paths of the integrated circuit are approximated by one of a number of simplified topologies based on path width, length, or other parameters. The input drive waveform is similarly reduced. That is, the electrical circuit representing the interconnect and its input are reduced to a set of numerical values sufficient to model the circuit and input such that the modeled circuit and input have the same output, within a tolerable error, as the original circuit and original input. This reduction technique is designed to reduce an interconnect path and input waveform to a fixed number of values.

These values are mapped to a set of parameters which specify a location in a multidimensional predetermined grid array. The grid array may be formed and cached either in advance or contemporaneously. Each point in the grid array corresponds to a set of values relating to a path topology, input waveform, and corresponding output waveform. The desired output is found by interpolating the location found above with nearby points in the predetermined array. A delay from input to output may then be back annotated to each path or trace. The output waveforms and delays may be found as part of a timing extraction process, or as part of a circuit block or chip level simulation.

In this way, much of the computational effort, determining the grid array, may be done in advance of the circuit simulation. The simulation algorithm may be the fast table based linear subcircuit tearing method described in U.S. patent application Ser. No. 10/305,797, titled High Speed Non linear Electrical Simulation of VLSI Circuit Interconnect, but could be any electrical simulator capable of evaluating the time delay of the appropriate class of electrical circuit. For example, SPICE is a general purpose electrical simulator that could be used.

Thus, embodiments of the present invention simplify large block and chip level simulations. Also, since the output waveforms in the grid array may be precomputed and cached, they can be determined to a high degree of accuracy. Because interpolation between points in the array is used to determine the resulting output waveform, fewer grid points need to be cached, thus saving memory.

A better understanding of the nature and advantages of the present invention may be gained with reference to the following detailed description and the accompanying drawings.

BRIEF DESCRIPTION OF THE DRAWINGS

FIG. 1A illustrates a integrated circuit portion that may be modeled and simulated using embodiments of the present invention, while

FIG. 2A illustrates a more complicated electrical circuit portion of an integrated circuit, while

DESCRIPTION OF EXEMPLARY EMBODIMENTS

One embodiment of the present invention provides a method for improving the speed of electrical simulations of integrated circuits. The method is applicable to simulations of VLSI circuits that may be performed for the purpose of timing extraction, or for full chip, block, or circuit level simulations. One particular type of circuit that may be simulated includes a driving element, one or more routing wires, and one or more electrical loads, together with an input stimulus representing a voltage waveform. The simulator determines an output voltage as a function of time at some specified location in the circuit. Typically, many such circuits are simulated in the timing extraction of a complete VLSI circuit. These circuits are often similar, in that there are many simulations for each distinct type of driving element, but with many different loadings. The invention speeds up the simulation of a large number of similar circuits by using caching and interpolation to store the simulation results for a set of circuits, and determines the simulation result for a given circuit by using the cached results for similar circuits to compute an approximate result.

Caching and interpolation are most effective on mathematical functions that can be completely described using a fixed number of parameters. Although the set of circuits to be simulated may have a variable number of circuit elements, according to the invention, a given circuit is reduced to one of a number of model circuits, such that the reduced circuit has electrical behavior similar to the original circuit, but has a fixed number of circuit elements and a fixed topology. This is referred to as model reduction.

Figure 1A:
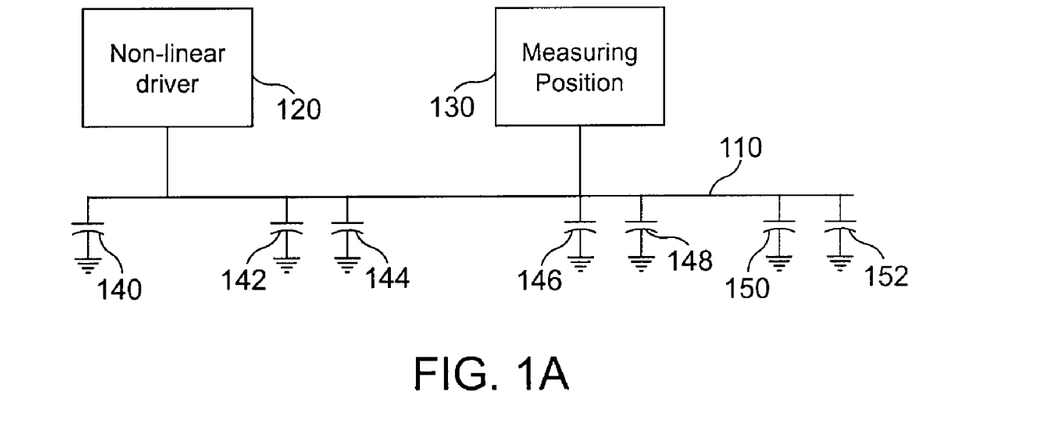

FIG. 1A illustrates an integrated circuit portion 100 including a non-linear driver 120, measuring position 130, interconnect line 110, and load capacitors 140, 142, 144, 146, 148, 150, and 152. This figure, as with all the included figures, is included for illustrative purposes only and does not limit either the possible embodiments of the present invention or the claims.

This circuit portion represents a routing path that a simulator often encounters. The circuit may represent a portion of a programmable logic device or it may represent a portion of another type of VLSI circuit. The non-linear driver 120 may be any type of driver, which in the case of PLD may be a routing switch, such as a pass transistor, buffer and pass transistor, or multiplexer and buffer. The driver 120 may alternately be another type of driver, for example a logic gate, register, or memory cell.

The measuring position is specified as a location on the routing wire, for example the input of a gate receiving a signal from the driving element. Multiple measuring positions may be handled by repeatedly applying embodiments of the present invention. The routing wire may have an any number of loads, and may be modeled by a resistance and capacitance per unit length, or a lumped model with a number of resistances and capacitances. In a programmable logic device, often each load is an input mux or pass transistor, which may be modeled using a linear electrical circuit, such as an RC model. Alternately, non-linear models may be used for greater accuracy.

Figure 1B:
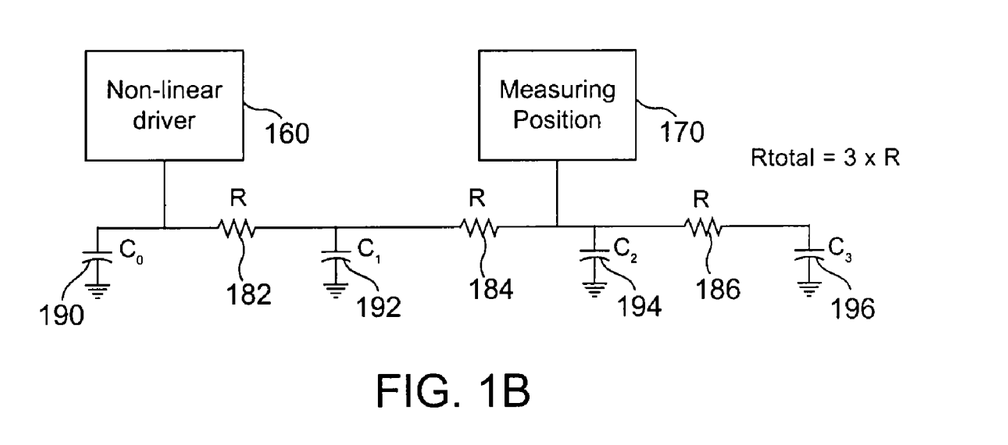
FIG. 1B illustrates a reduced model circuit that approximates the circuit of FIG. 1A.

FIG. 1B illustrates a reduced model circuit that approximates the circuit of FIG. 1A. Included are non-linear driver 160, measuring position 170, resistors 182, 184, and 186, and capacitors C0 190, C1 192, C2 194, and C3 196. The resistor values shown model the resistances of the trace 110 in FIG. 1A. The capacitors model the combined load capacitances and trace parasitic capacitances. The criteria for the reduced model circuit shown in FIG. 1B is that it responds electrically in a manner similar to the circuit shown in FIG. 1A, within an acceptable margin of error.

To improve the matching of the original circuit and reduced model circuit, several properties may be matched. The total resistances of the resistors in the reduced model can be adjusted to match the total resistance of the interconnect trace of the input circuit being modeled. Similarly, the total capacitances of the loads in the reduced model circuits can be adjusted to match the total capacitances of the loads in the input circuit. Also, the RC delay to each load in the reduced circuit may be matched to the RC delays in the circuit of FIG. 1A.

Figure 2A:
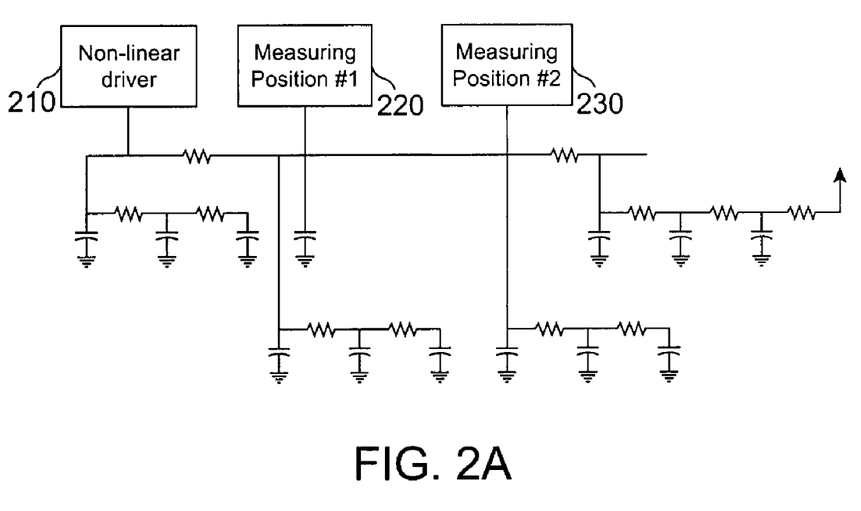
Figure 2B:
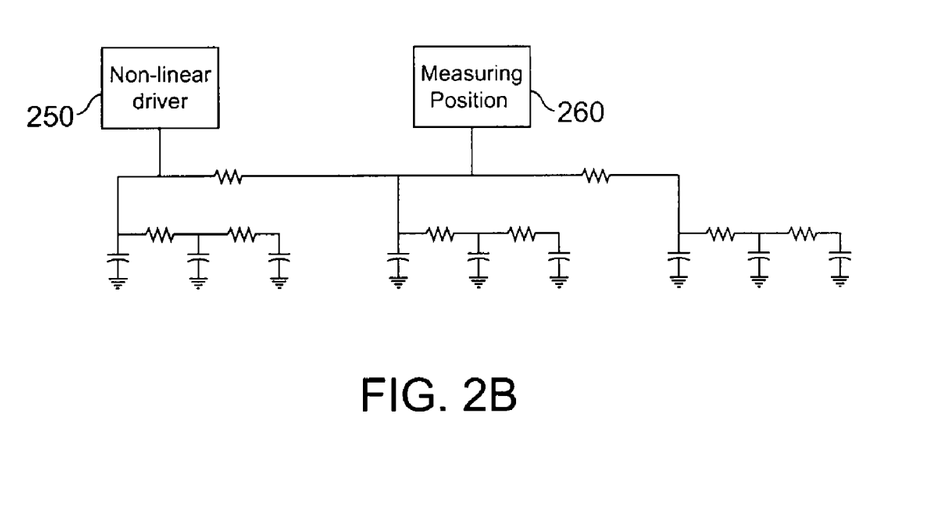
FIG. 2B illustrates a reduced model circuit that approximates the circuit of FIG. 2A.

FIG. 2A illustrates a more complicated electrical circuit portion of an integrated circuit. Included are a non-linear driver 210, and measuring positions 220 and 230. FIG. 2B illustrates one possible reduced model circuit including a non-linear driver 250 and measuring position 260.

By simplifying a circuit portion, such as those shown in FIGS. 1A and 2A, into one of a number of reduced model topologies, such as those shown in FIGS. 1B and 2B, the number of possible circuits that are simulated in a timing extraction or other type of simulation is greatly reduced.

Typically, there is more than one model circuit topology used, for example, there may be one for each of the distinct types of drivers and lengths of routing wires used in a VLSI circuit. The model circuit for a longer length of routing wire typically requires more resistors and capacitors than a shorter length of routing wire. The best model circuit is often similar to the type of circuit that is being simulated. The choice of the topology of the model circuit and the number of parameters is generally determined by finding the simplest possible model circuit that achieves suitable accuracy for the input circuit.

Figure 3:
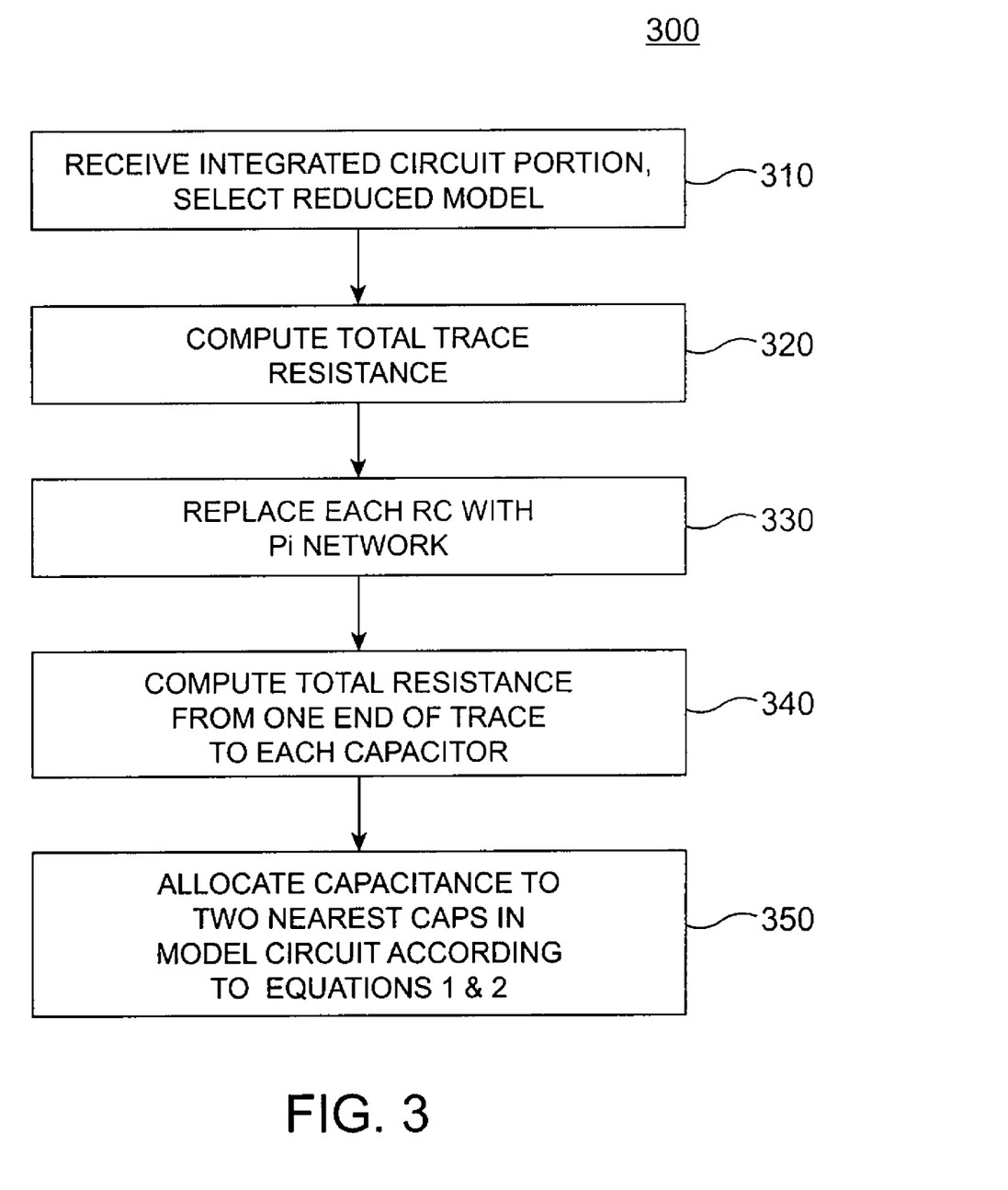
FIG. 3 is a flowchart illustrating the steps used in generating a reduced model circuits according to an embodiment of the present invention.

FIG. 3 is a flowchart illustrating the steps used in generating a reduced model circuit according to an embodiment of the present invention. In short, the total resistance of the wires in the circuit is computed. Next, for each load capacitance, the resistance between the end of the wire and that capacitor is computed. A fraction of each capacitive load is then allocated to the capacitors in the model circuit.

In act 310, an integrated circuit portion is received. The integrated circuit portion is analyzed, and an appropriate reduced model topology is selected. In act 320, the total trace resistance is computed. For example, if the resistance for micron and length of the trace is available, the total may be computed using the equation:

$$R\text{total}=\text{sum}(r\_\text{per micron}[i]*\text{length}[i]),$$

where r_per micron[i] is the resistance of the trace per micron of length of a trace section i, while length[i] is the length of the trace section i.

In practical integrated circuit portions, an interconnect line may include segments from several different metal and other interconnect layers, such as diffusion and polysilicon. Each of these layers may have a different resistance per micron. In act 330, each distributed RC is replaced with a Pi network. A Pi network includes a single resistor equivalent to the resistance of the RC and a capacitance of half the wire placed at each end of the resistor.

In act 340, the total resistance from one end of the trace to each capacitor is computed. In act 350, each capacitor is allocated to the two nearest capacitors in the model circuits according to the following equations:

$$\Delta C_k = C_i \times \frac{R_{k+1} - R_i}{R_{k+1} - R_k} \quad \text{Eq. 1}$$

$$\Delta C_{k+1} = C_i \times \frac{R_i - R_k}{R_{k+1} - R_k} \quad \text{Eq. 2}$$

where $C_i$ is the load being allocated, $R_i$ is the total resistance to $C_i$ from the start of the line, $C_k$ and $C_{k+1}$ are the model capacitors on either side of $C_i$, $R_k$ and $R_{k+1}$ are the total resistance to $C_k$ and $C_{k+1}$ from the start of the line, and $\Delta C_k$ is an increment of capacitance allocated to $C_k$ corresponding to the capacitor $C_i$.

The above two equations come from solving the equations:

$$\Delta C_k + \Delta C_{k+1} = C_i$$

$$R_i \times C_i = R_k \times \Delta C_k + R_{k+1} \times \Delta C_{k+1}$$

For example, if an input load of 30 fF is located at 20 ohms along the wire and model capacitors are at 0 ohms and 30 ohms, then 10 fF will be added to the model capacitor located at 0 ohms and 20 fF added to the model capacitor located at 30 ohms.

FIGS. 4A-E illustrate a specific example of a circuit simplified to a reduced model circuit according to the flowchart of FIG. 3. At the end of model reduction shown in FIG. 4, the circuit can be characterized by the set of parameters Rtotal=23 ohms, C0=6.12 ff, C1=7.92 ff, C2=24.94 ff, C3=8.01 ff, drive_position=0.13, load_position=0.87, where the positions indicate the fraction of Rtotal to the left of that point. That is, this particular circuit can be reduced to a set of 7 parameters.

Figure 4A:
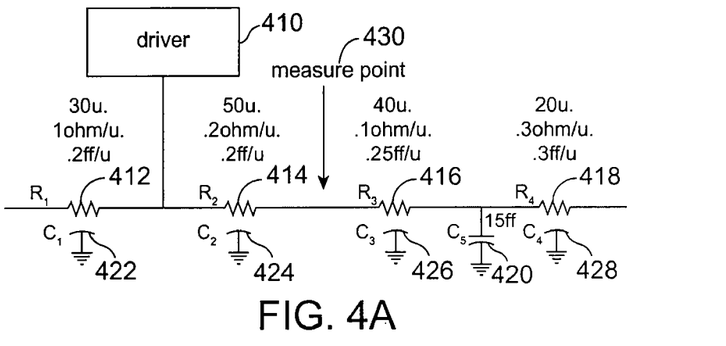
FIGS. 4A-4E illustrate a specific example of a circuit simplified to a reduced model according to the flowchart of FIG. 3.

FIG. 4A is an original circuit that can be approximated by a reduced model by following a method in accordance with an embodiment of the present invention. Included are a driver 410, trace resistances R1 412, R2 414, R3 416, and R4 418, stray or parasitic capacitances C1 422, C2 424, C3 426, and C4 428, load capacitor C5 420, and measuring point 430. The load capacitor C5 420 may be a gate capacitance of a buffer or other device capacitance. The component values are given in terms of units per micron of run length, and the length of the individual trace portions is also provided. These values may be derived by a layout parameter extraction tool or similar program. Alternately, particularly on a more regular integrated circuit such as a programmable logic device, the resistance and capacitance values for the individual traces may be known and read from a lookup table as needed.

Figure 4B:
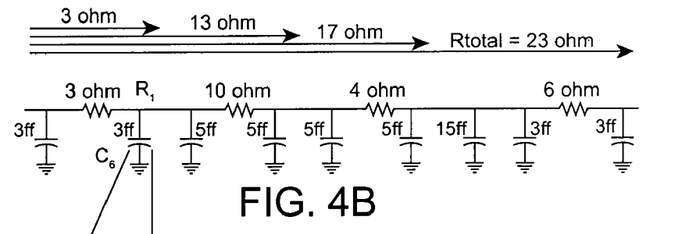

In FIG. 4B, the individual resistance values are determined. Also, the capacitance for each of the trace is determined, divided in half, with a capacitor equal to one-half of the trace value placed at each terminal of the corresponding resistor. Specifically, capacitor C6 having a value of 6 fF is shown divided in half, each half placed at a terminal of R1 as capacitors C7 446 and C8 448.

Figure 4C:
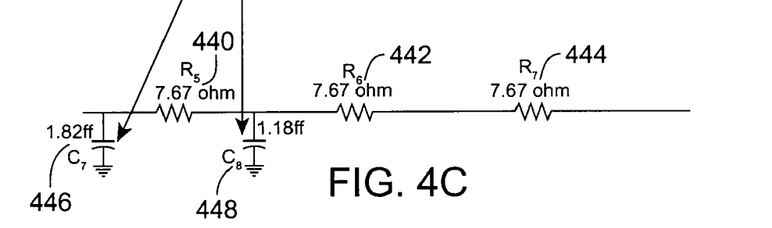
Figure 4D:
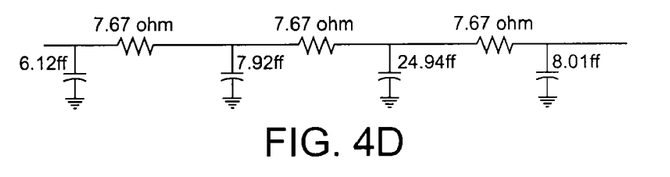

In FIG. 4C, Rtotal, 23 ohms, is shown as being divided into three separate resistors, R5 440, R6 442, and R7 444. Each of the capacitors are reallocated as shown by equations 1 and 2. For example, the capacitor C2 432 is reallocated as C7 446 and C8 448. In FIG. 4D, all of the capacitors have been reallocated.

Figure 4E:
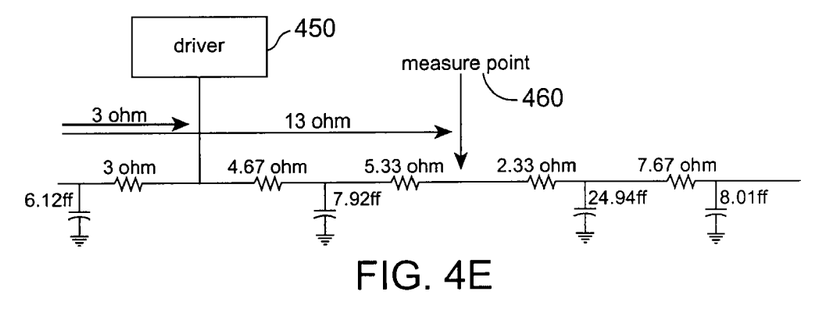

In FIG. 4E, the series resistances R5 440 and R6 442 are split, and the driver 410 and measuring point 430 have been attached. For the same waveform provided by drivers 410 and 450, an output waveform seen at the measuring point 460 is very similar to the waveform seen at measuring point 430.

There are two inputs to a simulator program that is consistent with an embodiment of the present invention. The first is the reduced model circuit generated in the above method, or other method that is consistent with the present invention. The second is an input stimulus that specifies an input voltage as a function of time.

Like the circuit portion, the input stimulus is also simplified. This process is referred to as waveform reduction. The input waveform is reduced to a set of numbers that is combined with the set of numbers from the electrical circuit to specify a point in a multidimensional grid. Several numerical methods may be used to reduce the input waveform to a fixed set of numbers, and from that set of numbers, a waveform may be produced that generates an output from the electrical circuit that is the same, within an acceptable error, as an output generated by the original input waveform.

Typically the waveform is reduced by assuming that it is either monotonically increasing or monotonically decreasing, and then sampling the time required for the waveform to change between selected voltage thresholds, such as 10% and 90% of VDD. The duration of time between two voltage thresholds becomes one value in the set of parameters that describe the input waveform.

Figure 5:
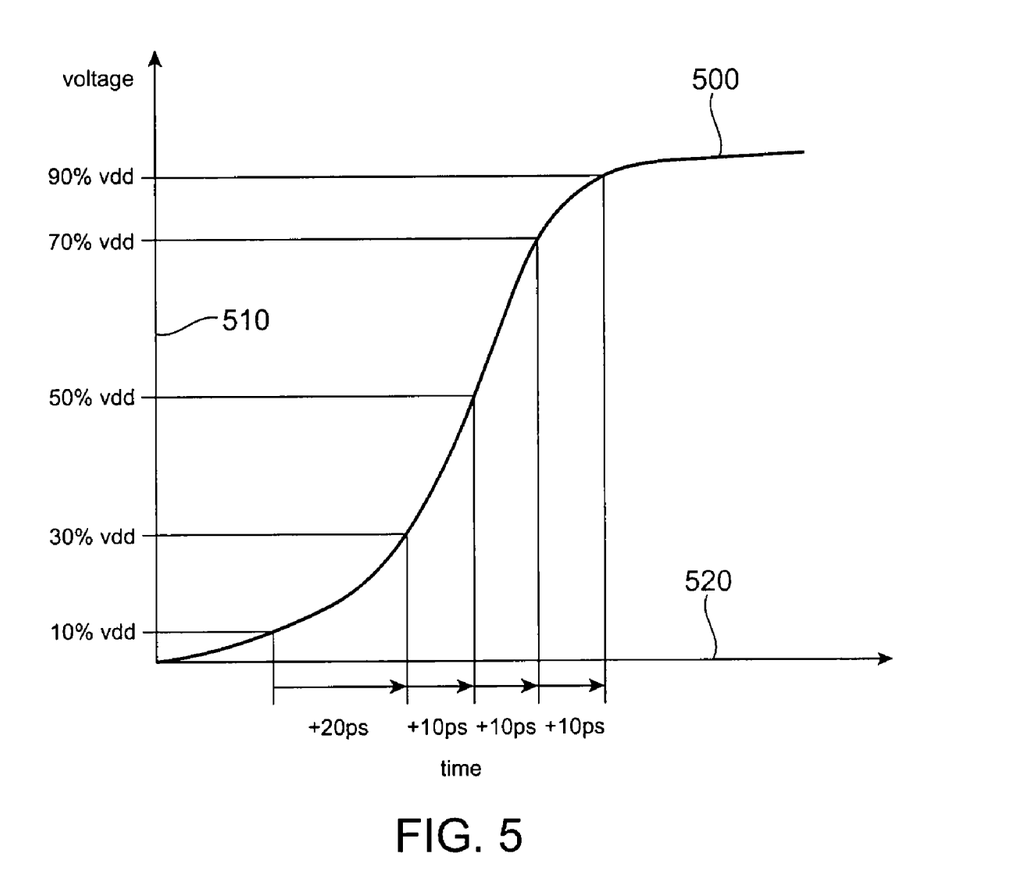
FIG. 5 is an example of an input waveform and its reduction to a set of parameters in accordance with an embodiment of the present invention.

FIG. 5 is an example of an input waveform 500 and its reduction to a set of parameters in accordance with an embodiment of the present invention. The waveform is plotted against a Y-axis 510 of voltage and an X-axis 520 of time. In FIG. 5, the selected thresholds are 10, 30, 50, 70 and 90 percent of the supply voltage VDD. These thresholds are crossed at times t, t+20 ps, t+30 ps, t+40 ps, and t+50 ps. The value of t can be removed if we are interested in the delay contributed by the circuit portion under simulation. Also, if needed, the waveform can be shifted after simulation to compensate for the removal of the value of "t." Removing t simplifies the values stored in cache and simplifies interpolation between points in the grid array. Accordingly, this waveform can be reduced to the set of numbers (20, 10, 10, 10). Alternately, the waveform can be described by the values (20, 30, 40, 50), where the number are absolute rather than deltas between thresholds.

The waveform of FIG. 5 can be reconstructed from this set of numbers by using standard linear interpolation. Alternately, the input waveform can be reconstructed using a more complex numerical method such as a spline. Often a spline is more complex than required and linear interpolation produces a waveform whose output is sufficiently similar to the output from the original waveform and original circuit.

In many logic circuits, an output only begins to switch after a voltage at the logic circuit's input has passed through a threshold or trip point. At this time, the input voltage often begins slowing, that is, its rate of change in voltage decreases. This means that the second derivative of the input waveform has a constant sign with respect to time. In simpler terms, the input waveform is either be concave up or concave down after the trip point. This causes a waveform reconstructed by linear interpolation to have a fixed sign of error due to the interpolation process.

Figure 6:
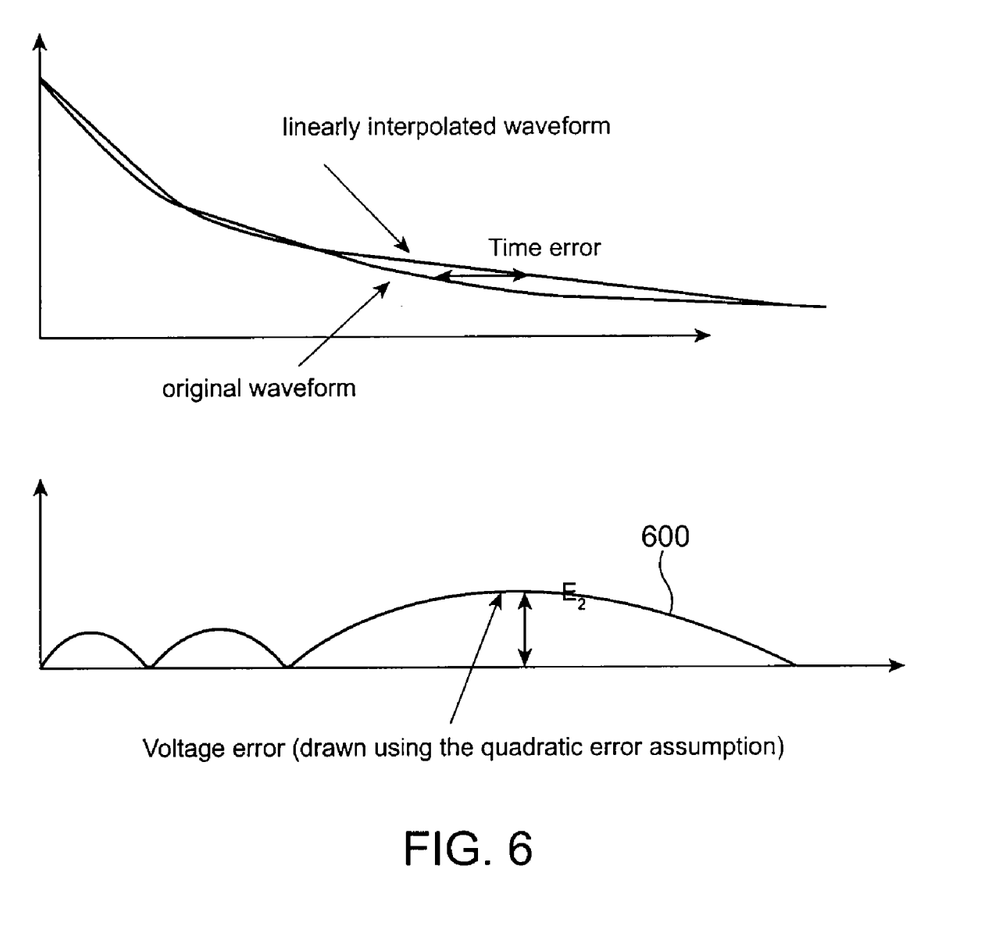
FIG. 6 shows an example of errors that result in input waveform reconstruction using linear interpolation of the time values found in FIG. 5.

FIG. 6 shows an example of the errors 600 that result in input waveform reconstruction using linear interpolation of the time values found in FIG. 5. The error is zero at the threshold intersections, and increases between thresholds to a level shown as E2. The voltage error may be reduced by storing more threshold points, though this increases the memory needed to store the input waveforms. This error can also be reduced by adjusting the time voltage points used for interpolation by subtracting some fraction of the error caused by linear interpolation.

Figure 7:
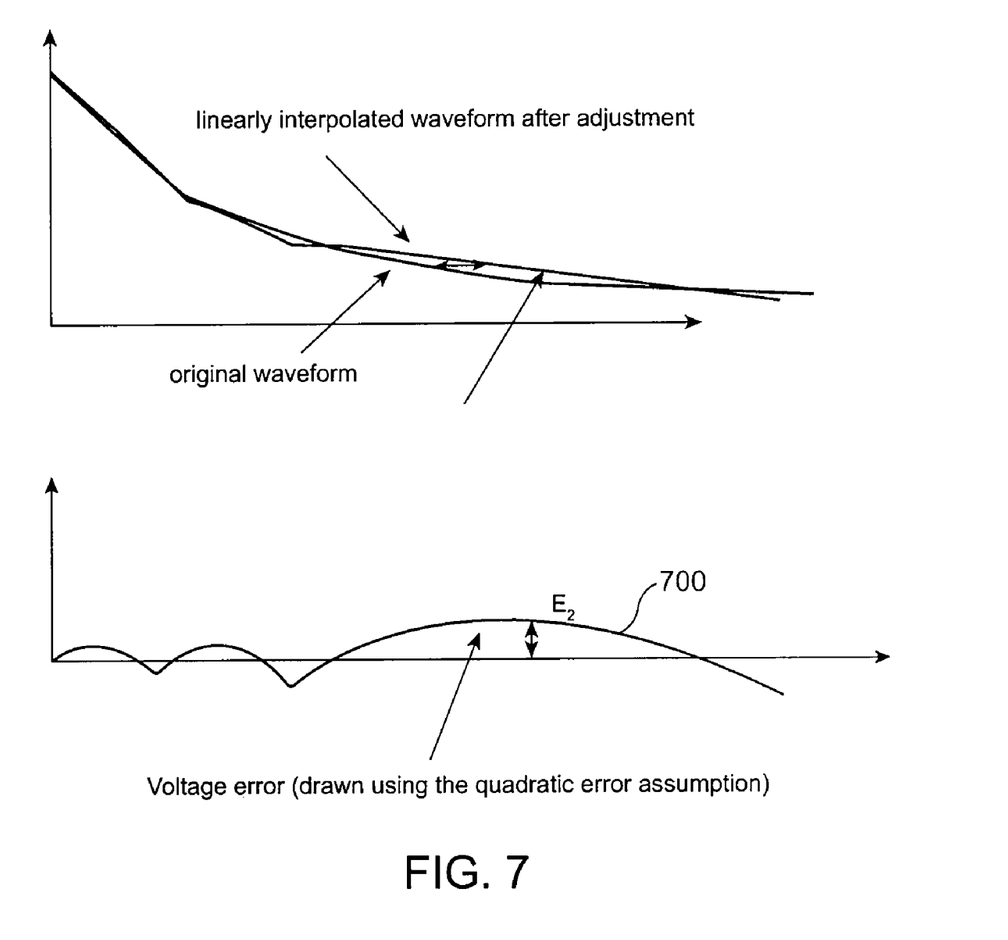
FIG. 7 illustrates an example of a method of reducing the voltage error resulting from a linear interpolation of the time values found in FIG. 5.

FIG. 7 illustrates an example of a method of reducing the voltage error 700 resulting from a linear interpolation of the time values found in FIG. 5. As can be seen, the worst case error E2 is reduced by approximately half using this adjustment. The area for each of the segments between adjacent time voltage coordinates is computed assuming that the piecewise error is quadratic in this region. This area is transformed into a trapezoid of equal area with X coordinates corresponding to the time points used for the interpolation interval and the two adjacent intervals.

Figure 8:
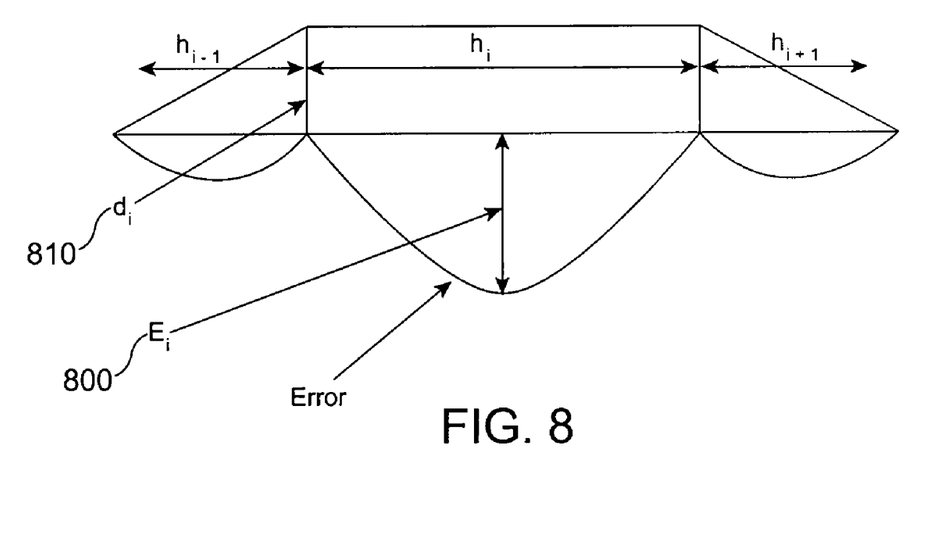
FIG. 8 illustrates the method of reducing an error voltage shown in FIG. 7 in greater detail.

FIG. 8 illustrates the method of reducing an error voltage 800 as shown in FIG. 7 in greater detail. Assuming the voltage error is error is quadratic in nature, the total area of the error is $$\frac{2 \times h_i \times E_i}{3}.$$

The equivalent area is distributed in the trapezoid with area $$d_i \times \left(\frac{h_{i-1}}{2} + h_i + \frac{h_{i+1}}{2}\right) \text{ so } d_i = \left(\frac{4 \times h_i \times E_i}{3 \times (h_{i-1} + 2 \times h_i + h_{i+1})}\right).$$

Each error interval is then distributed by adjusting the $y_1$ and $y_{i+1}$ by $d_i$ 810. Other formulae will be appropriate for different methods of interpolation.

The set of parameters reduced from the input waveform is combined with the set of parameters reduced from the original circuit together to form a single set of parameters that is a point in a multidimensional grid. The number of dimensions in this grid equals the total number of parameters. At each point throughout the grid ("meshpoints"), reduced output waveforms are stored or cached. Similar to the input waveforms above, the output waveforms are stored as a set of numbers. The waveforms may either be stored directly as a set of time voltage pairs, as produced by simulation, or reduced according the waveform reduction method described above.

These output waveforms are found by simulating the corresponding reduced model circuit and reduced input waveform. These simulations may be run ahead of time and cached. In this case, they may also be read as part of the input program. Alternately, these simulations may be run dynamically as the larger circuit simulation is done. Simulating the interconnect in advance of running the larger simulation program means that the reduced output waveforms are distributed with the program. This creates extra data as well as difficulties in ensuring that correct data values are used with each different version of the program, but allows more accurate simulations to be used for loading the cache. Running these interconnect simulations dynamically has the advantage of eliminating the need for extra data storage, but means that a net speedup is observed only if the number of times that the cache is used exceeds the number of gridpoints that are simulated while dynamically computing output waveforms to be stored in the grid.

It is also desirable that the values stored in the cache be linear as a function of grid position to enhance accuracy of linear interpolation between gridpoints. This can be achieved by choosing suitable functions for mapping between model circuit parameters and the parameter values stored in the cache. For example, in a reduced model circuit such as those shown above, it may be that the functions in the grid are more linear if the set of parameters includes Rtotal*$C_i$ instead of $R_i$ and $C_i$. That is, if the value of a function is proportional to R*C, then a cache function f(R*C,C) would be nearly linear and interpolation would produce an accurate result, while the function g(R,C) would not be as linear and interpolation would thus produce a less accurate result.

For example in FIG. 1B, each $C_i$ may be multiplied by total resistance separating Ci from the driver and the result of each multiplication added to the set of parameters. If this is done, then the set of parameters does not need to include the value of $C_i$ itself. However, since each element in the set of numbers is used by the caching mechanism to specify a point in a multidimensional grid, the minima and maxima of the grid may change resulting in a larger total grid size that consumes more memory. It has been found that often when the circuit of FIG. 1A is used as the model circuit, this multiplication results in additional complexity and increased grid size and is not required for acceptable cache accuracy.

The mapped parameters are not necessarily exactly the same set of values required to specify the electrical parameters of each of the devices, but there is a one-to-one relationship between the two, such that a model circuit maps into a unique set of parameter values, and any set of mapped parameter values can be converted back to the model circuit.

Once the circuit and its input have been converted to a set of numbers specifying a location among the various points in the grid, the corresponding output waveform is found. This is done by locating the mapped parameters in the grid array and then interpolating between output waveforms stored at surrounding mesh points.

The mathematical method for doing the interpolation should require as few gridpoints as possible in order to minimize the simulation runtime. This is particularly true if the output waveforms at the gridpoints are computed dynamically. Many different interpolation methods may be used.

One specific embodiment of the present invention splits the total dimensions of the grid into two smaller groups of dimensions. Separate interpolations are then done over each group. For example, a four dimensional grid may be partitioned into two two-dimensional grids using the relation:

$$h(x_1,x_2,x_3,x_4)=g_1(z_1,z_2,x_3,x_4)+g_2(x_1,x_2,z_3,z_4)-f(z_1,z_2,z_3,z_4)$$

Where g( ) is the interpolation function used on one of the smaller groups of dimensions, f( ) is the function being interpolated, and h( ) is the overall interpolation function. For computational efficiency, the point ($z_1$, $z_2$, $z_3$, $z_4$) is kept the same for all evaluations of h( ) and the value of f($z_1$, $z_2$, $z_3$, $z_4$) is stored to avoid its repeated calculation.

Alternately, a grid array may be split into more than two smaller groups of dimensions or grid arrays. This splitting is done so that the g( ) interpolation function may be written as a simple linear interpolation function without requiring an unreasonably large number of gridpoints to be stored. The use of a simple linear interpolation requires a larger number of grid points than a more accurate non-linear interpolator, thus breaking the interpolation into two or more smaller grids mitigates this increase in memory.

Although in principle any one of a number of interpolation methods can be used for g( ), a specific embodiment of the present invention uses a simple linear interpolation to approximate the value at the specified point by computing the first derivatives along each of the dimensions and adding in the corresponding offset. This is done as follows:

$$g_1(z_1, z_2, x_3, x_4) \cong$$

$$\frac{(x_3 - x_{3,k})}{h_3} x(f(z_1, z_2, x_{3,k-1}, x_{4,k}) - f(z_1, z_2, x_{3,k}, x_{4,k})) +$$

$$\frac{(x_4 - x_{4,k})}{h_4} x(f(z_1, z_2, z_{3,k}, x_{4,k+1}) - f(z_1, z_2, x_{3,k}, x_{4,k})) +$$

$$f(z_1, z_2, x_{3,k}, x_{4,k})$$

where $x_i$ are the independent variables, $x_{i,k}$ are the grid points, $h_i = x_{i,k+1} - x_{i,k}$ is the spacing between grid points, and $z_i$ are the $z_i$ that were chosen when setting up the h( ) interpolation function. This definition of g is particularly useful if output waveforms are being dynamically computed and stored at gridpoints.

A specific embodiment of the present invention places the dimensions corresponding to the parameters reduced from the original input waveform in one group and the dimensions that correspond to other parameters in another.

No particular method of interpolation is required. There are several multidimensional interpolation methods that may be used. Another embodiment of the invention uses a first order polynomial that includes all terms having a power of less than or equal to one, but requires $2^n$ multiplications in contrast to the n multiplications of the simple linear interpolation.

Figure 9:
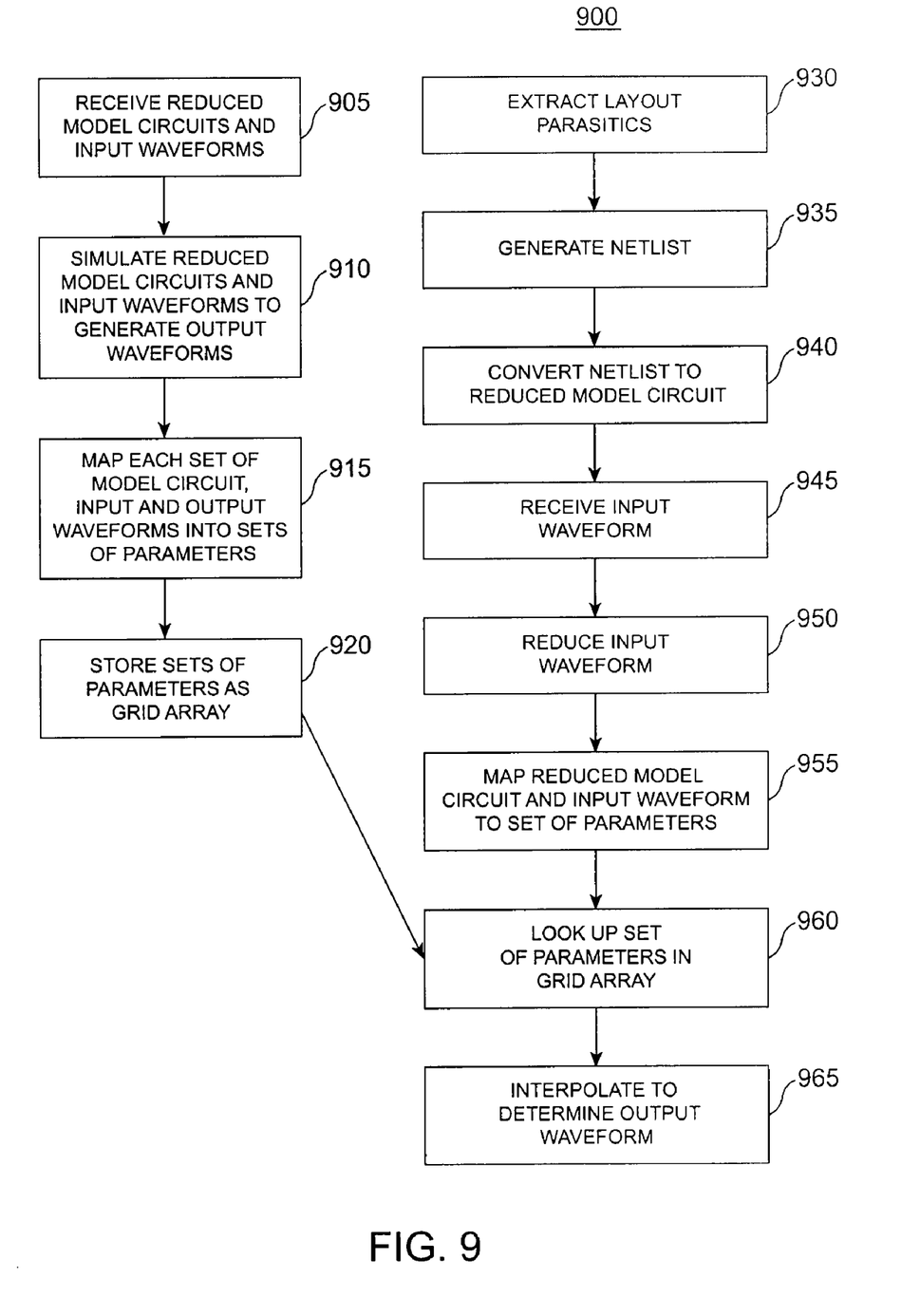
FIG. 9 is a flow chart of a method of simulating an integrated circuit consistent with an embodiment of the present invention.

FIG. 9 is a flow chart 900 of a method of simulating an integrated circuit consistent with an embodiment of the present invention. In act 905, a number of reduced model circuits and input waveforms are received. These reduced model circuits and input waveforms are simulated in act 910, thereby generating corresponding output waveforms. In act 915, each of the model circuits, corresponding input waveform, and resultant output waveform are mapped into sets of parameters.

In act 920, a grid is constructed, where each grid point corresponds to a set of parameters mapped from a model circuit and input waveform. This grid array may be constructed and cached ahead of time, or dynamically generated while the circuit simulation is running.

In act 930, the layout parasitics of one or more interconnect traces are extracted using a layout parameter extraction tool, lookup table, or other method. In act 935, a netlist is generated. In act 940 this netlist is converted to a reduced model circuit having a topology that is the same as the reduced model circuits received in act 905. In act 945, an input waveform is received. In act 950, that input waveform is reduced to a set of parameters. The reduced model circuit and corresponding input waveform are mapped to a set of parameters in act 955. In act 960, this set of parameters is located in the grid array constructed in act 920. In act 965, an output waveform is determined by interpolating between two or more nearby points of this grid array.

Figure 10:
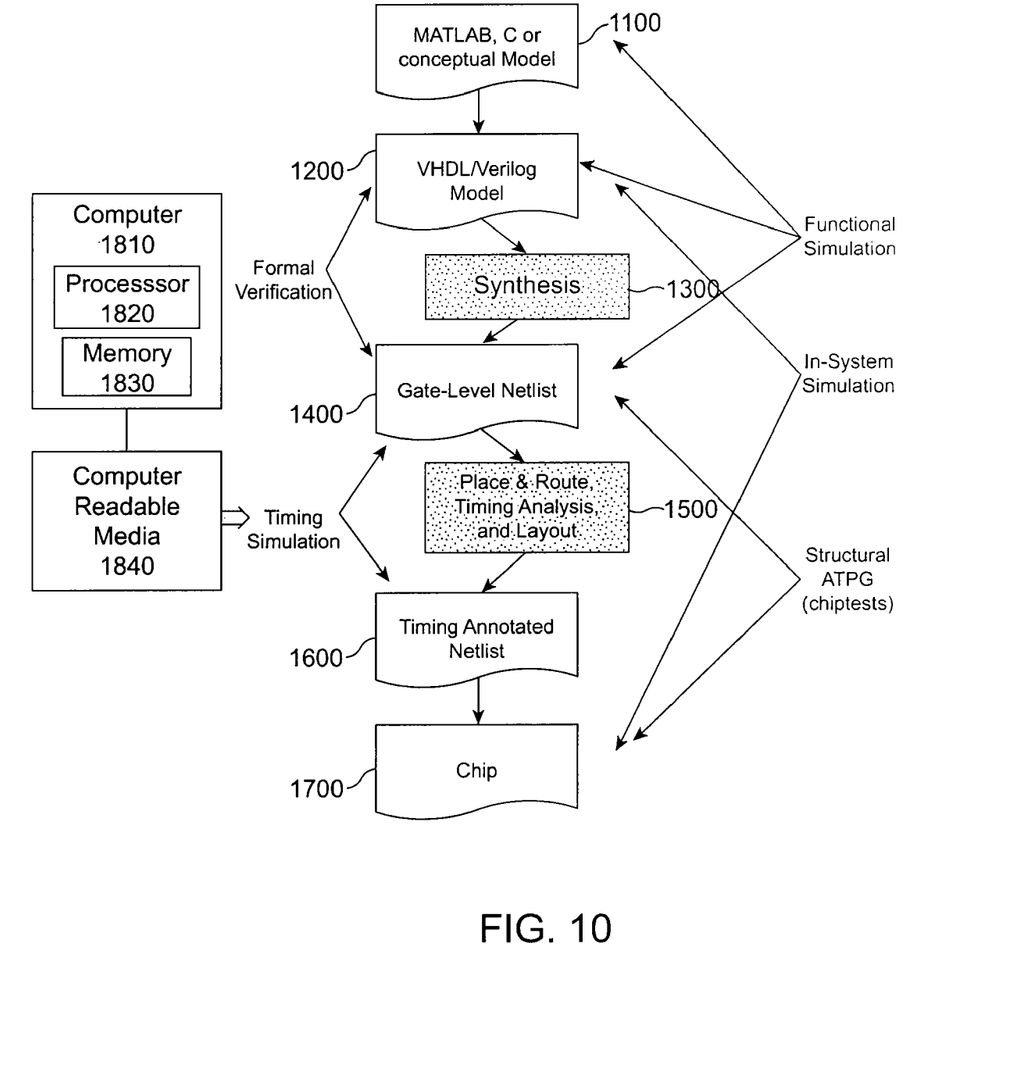
FIG. 10 is a flow chart showing acts and files used in a design process that may benefit by the use of embodiments of the present invention.

FIG. 10 is a flow chart showing the acts in a design process that may benefit by the use of embodiments of the present invention. To begin, a Matlab, C, conceptual, or other model file 1100 is generated. This model 1100 is a logical representation of a function to be performed by a final integrated circuit or integrated circuit portion. From this, a VHDL, Verilog, AHDL (Altera hardware description language), or other HDL model 1200 (referred to as simply a VHDL or Verilog model) is generated. Alternately, the VHDL or Verilog model may be generated directly, skipping generation of the model file 1100. This model is synthesized in act 1300 to generate a gate level netlist 1400. Specifically, the VHDL or Verilog model 1200 is converted to a non-optimized gate level netlist, made up of gate level logic functions such as OR, NAND, and other gates, as well as flip-flops, latches, pass gates, multiplexers, and other logic functions. This non-optimized netlist is "optimized," that is, improved or simplified, by the synthesizer. The optimized netlist undergoes a process referred to as technology mapping. For example, logic gates may be converted to look-up tables, product terms, or similar functions, particularly if the end integrated circuit is an FPGA or PLD. The conversion of the VHDL or Verilog model 1200 to a gate level netlist 1400 may be referred to as synthesis or formal verification.

The gate level netlist 1400 is then fitted to an integrated circuit layout, for example, by using a place and route program. The physical locations of the gates, and other information such as routing distances are determined in act 1500. From this, parasitic extraction is performed, and a timing simulation using embodiments of the present invention is run. This timing simulation, and the other acts described, may be executed using a computer 1810 or other system, for example a computer system including a processor 1820 coupled to a memory 1830. The simulation program may be stored on a computer readable medium 1840 for reading by such a computer system 1810.

The output of the timing simulation, or timing extraction, can be used to generate an annotated netlist 1600. This netlist is used to generate the final integrated circuit 1700. The integrated circuit 1700 may be a programmable logic device, filed programmable gate array, or other integrated circuit.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of simulating an integrated circuit comprising:
receiving a first model of a first circuit portion;
converting the first model of the first circuit portion to a second model of the first circuit portion, the second model comprising a plurality of electrical components having a first set of values, the second model having a circuit topology;
receiving a first input waveform having by a second set of values;
defining a first multidimensional data point that includes the first set of values and the second set of values;
determining a first output waveform corresponding to the first multidimensional data point by interpolating a plurality of multidimensional data points including a second multidimensional data point and a third multidimensional data point, thereby obtaining the first output waveform corresponding to the second model and the first input waveform;
determining a delay using the first output waveform;
annotating a netlist with the delay; and
providing the annotated netlist,
wherein the second multidimensional data point comprises a second set of input parameters representing:
a third model of a second circuit portion comprising a plurality of electrical components having the circuit topology,
a second input waveform, and a second output waveform, and wherein the third multidimensional data point comprises a third set of input parameters representing:
- a fourth model of a third circuit portion comprising a plurality of electrical components having the circuit topology,
- a third input waveform, and a
- third output waveform.

2. The method of claim 1 further comprising:
generating the second multidimensional data point by:
- receiving the third model having the circuit topology;
- receiving the second input waveform;
- generating the second output waveform using the third model and the second input waveform; and
- converting the third model, the second input waveform, and the second output waveform to the second set of input parameters; and generating the third multidimensional data point by:
- receiving the fourth model having the circuit topology;
- receiving the third input waveform;
- generating the third output waveform using the fourth model and the third input waveform; and
- converting the fourth model, the third input waveform, and the third output waveform to the third set of input parameters.

3. The method of claim 2 further comprising:
- simulating the third model and the second input waveform to generate the second output waveform; and
- simulating the fourth model and the third input waveform to generate the third output waveform.

4. The method of claim 3 wherein the circuit topology is selected from a plurality of circuit topologies.

5. The method of claim 2 wherein the first circuit portion comprises an interconnect line.

6. The method of claim 5 wherein the interconnect line is a programmable interconnect line.

7. The method of claim 5 wherein the interconnect line is a programmable interconnect line and the first circuit portion further comprises a load capacitance.

8. The method of claim 2 wherein the circuit topology is one of a number of predetermined circuit topologies.

9. A computer readable medium storing a program for controlling a processor of a computer system to simulate an integrated circuit, the program comprising:
- code for receiving an array of multidimensional data points, each multidimensional data point containing parameters respectively relating to an input waveform, a circuit, and an output waveform;
- code for receiving a netlist;
- code for receiving a first input waveform;
- code for converting the netlist to a first reduced model circuit;
- code for converting the first reduced model circuit and the first input waveform to a set of second parameters;
- code for interpolating at least two of the multidimensional points to determine a first output waveform that corresponds to the first reduced model circuit and the first input waveform, wherein the interpolating uses the set of second parameters;
- code for generating a delay using the first output waveform;
- code for annotating the netlist with the delay; and
- code for providing the annotated netlist.

10. The computer readable medium of claim 9 wherein the code for converting the first reduced model circuit and the first input waveform to a set of second parameters comprises:
- code for determining a first plurality of thresholds;
- code for determining a first plurality of points in time where the first input waveform is equal to the second plurality of thresholds to generate a first set of values; and
- code subtracting a first value in the first set of values from each of the other values in the first set of values and removing the first value from the first set of values to generate a second set of values.

11. The computer readable medium of claim 10 further comprising:
- code for receiving a second reduced model circuit;
- code for receiving a second input waveform;
- code for generating a first output waveform using the second reduced model circuit and the second input waveform; and
- code for converting the second reduced model waveform, the second output waveform, and the second input waveform to a multidimensional point in the array of multidimensional points.

12. The computer readable medium of claim 11 further comprising:
- code for simulating the second reduced model circuit with the second input waveform to generate the second output waveform.

13. The computer readable medium of claim 12 wherein the second output waveform is used in the interpolation used to determine the first output waveform.

14. The computer readable medium of claim 13 wherein the first reduced model circuit and the second reduced model circuit have the same circuit topology.

15. The computer readable medium of claim 9 wherein the netlist represents a portion of a circuit including an interconnect line.

16. The computer readable medium of claim 9 wherein the code for interpolating the plurality of multidimensional points to determine a first output waveform selects multidimensional points that are adjacent to the first multidimensional points.

17. A method of simulating an integrated circuit comprising:
- determining an array of multidimensional data points, each multidimensional data point containing values respectively related to an input waveform, a circuit, and an output waveform, wherein determining a multidimensional data point includes:
  - receiving a first input waveform;
  - determining a first plurality of thresholds;
  - determining a first plurality of points in time where the first input waveform is equal to the first plurality of thresholds to generate a first set of values;
  - subtracting a first value in the first set of values from each of the other values in the first set of values and removing the first value from the first set of values to generate a second set of values;
  - receiving a first model having a circuit topology;
  - generating a first output waveform using the first input waveform and the first model;
  - generating a third set of values using the first output waveform;
  - generating a fourth set of values using the first model;
  - generating the multidimensional point using the second set of values, the third set of values, and the fourth set of values; and
- storing the array of multidimensional data points in a memory for use in simulating an integrated circuit.

18. The method of claim 17 wherein the third set of values is generated by:

determining a second plurality of thresholds;

determining a second plurality of points in time where the first output waveform is equal to the second plurality of thresholds to generate a fifth set of values;

subtracting a first value in the fifth set of values from each of the other values in the fifth set of values and removing the first value from the fifth set of values to generate the third set of values.

19. The method of claim 18 wherein the fourth set of values is generated by:

receiving a netlist;

converting the netlist to the reduced model circuit;

converting the reduced model circuit to a set of intermediate values; and mapping the set of intermediate values to the fourth set of values.

20. The method of claim 19 wherein the netlist corresponds to a portion of the integrated circuit including an interconnect line.

21. A system for simulating an integrated circuit, the system comprising:

a processor;

a memory coupled to the processor, the memory configured to store a plurality of code modules for execution by the processor, the plurality of code modules comprising:

a code module for receiving an array of multidimensional data points, each multidimensional data point containing parameters respectively relating to an input waveform, a circuit, and an output waveform;

a code module for receiving a netlist;

a code module for receiving a first input waveform;

a code module for converting the netlist to a first reduced model circuit;

a code module for converting the first reduced model circuit and the first input waveform to a set of second parameters;

a code module for interpolating at least two of the multidimensional points to determine a first output waveform that corresponds to the first reduced model circuit and the first input waveform, wherein the interpolating uses the set of second parameters;

a code module for generating a delay using the first output waveform; and a code module for storing the delay in a memory.

22. The system of claim 21 wherein the code module for converting the first reduced model circuit and the first input waveform to a set of second parameters comprises:

a code module for determining a first plurality of thresholds;

a code module for determining a first plurality of points in time where the first input waveform is equal to the second plurality of thresholds to generate a first set of values; and a code module for subtracting a first value in the first set of values from each of the other values in the first set of values and removing the first value from the first set of values to generate a second set of values.

23. The system of claim 22 wherein the plurality of code modules further comprises:

code for receiving a second reduced model circuit;

code for receiving a second input waveform;

code for generating a first output waveform using the second reduced model circuit and the second input waveform; and code for converting the second reduced model waveform, the second output waveform, and the second input waveform to a multidimensional point in the array of multidimensional points.

24. The system of claim 23 wherein the plurality of code modules further comprises:

code for simulating the second reduced model circuit with the second input waveform to generate the second output waveform.

25. The system of claim 24 wherein the second output waveform is used in the interpolation used to determine the first output waveform.

26. The system of claim 25 wherein the first reduced model circuit and the second reduced model circuit have the same circuit topology.

27. The system of claim 21 wherein the netlist represents a portion of a circuit including an interconnect line.

28. The system of claim 21 wherein the code for interpolating the plurality of multidimensional points to determine a first output waveform selects multidimensional points that are adjacent to the first multidimensional points.

29. A method of simulating an integrated circuit comprising:

receiving a first circuit portion comprising a first set of circuit components arranged in a first topology, the first set of circuit components having a first set of values;

converting the first circuit portion to a simplified model, the simplified model comprising a second set of circuit components arranged in a second topology, the second set of circuit components having a second set of values;

receiving a first input waveform;

converting the simplified model and the first input waveform into a first set of input parameters;

using the first set of input parameters to locate a first multidimensional data point in an array, the first multidimensional data point including values respectively corresponding to a second input waveform, a first output waveform, and a third set of components arranged in the second topology, the third set of components having a third set of values;

using the first set of input parameters to locate a second multidimensional data point in the array, the second multidimensional data point including values respectively corresponding to a third input waveform, a second output waveform, and a fourth set of components arranged in the second topology, the fourth set of components having a fourth set of values;

interpolating the first set of input parameters with the first multidimensional data point and the second multidimensional data point to determine a third output waveform corresponding to the first input waveform and the simplified model;

determining a delay using the third output waveform;

annotating a netlist with the delay; and providing the annotated netlist.

30. The method of claim 29 further comprising:

generating the first multidimensional data point by:

receiving the third set of components arranged in the second topology;

receiving the second input waveform;

generating the first output waveform using the third set of components and the second input waveform; and converting the third set of components, the second input waveform, and the first output waveform into values of the first multidimensional data point; and generating the second multidimensional data point by:

receiving the fourth set of components arranged in the second topology;
receiving the third input waveform;
generating the second output waveform using the fourth set of components and the third input waveform; and
converting the fourth set of components, the third input waveform, and the second output waveform into values of the second multidimensional data point.

31. The method of claim 30 further comprising:
simulating the third set of components and the second input waveform to generate the first output waveform; and
simulating the fourth set of components and the third input waveform to generate the second output waveform.

32. The method of claim 31 wherein the second topology is selected from a plurality of circuit topologies.

33. The method of claim 30 wherein the first circuit portion comprises an interconnect line.

34. The method of claim 33 wherein the interconnect line is a programmable interconnect line.

35. The method of claim 33 wherein the interconnect line is a programmable interconnect line and the first circuit portion further comprises a load capacitance.

36. The method of claim 30 wherein the second topology is one of a number of predetermined circuit topologies.

\* \* \* \* \*